Sept. 29, 1953          J. W. JONES          2,653,994
COLOR WHEEL FOR TELEVISION
Filed July 12, 1951
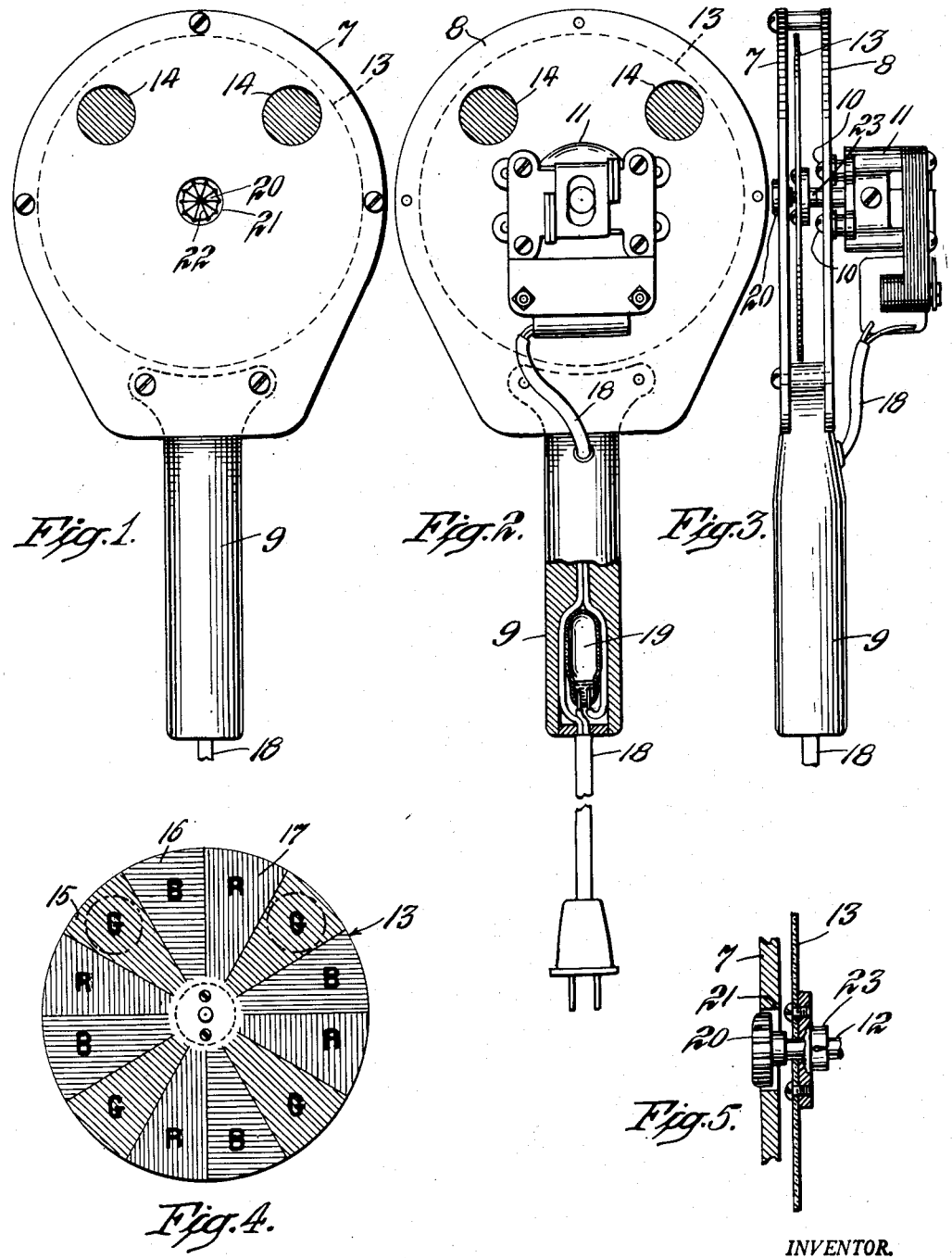
INVENTOR.
JOSEPH W. JONES
BY
ATTORNEY Patented Sept. 29, 1953

2,653,994

UNITED STATES PATENT OFFICE 2,653,994

COLOR WHEEL FOR TELEVISION

Joseph W. Jones, New York, N. Y.

Application July 12, 1951, Serial No. 236,293

5 Claims. (Cl. 178—5.4)

The invention disclosed in this patent application is a color wheel for translating pictures appearing in black and white on a television screen, into their true colors.

Special objects of the invention are to provide a motor driven color wheel in a small, light, portable form which may be held in the hand and which will operate in synchronism with the pictures and be readily and immediately adjustable for bringing the colors into proper phase.

Special objects of the invention also are to provide this device in an attractive but inexpensive form and one which will be automatic in its operation, starting with raising it into position for use and stopping upon laying it aside.

Other important objects of the invention are to provide the device in a well balanced form which will not tire the hand in holding it in position for use.

Other desirable objects attained by the invention are set forth or will appear in the course of the following specification.

The drawing accompanying and forming part of the specification illustrates a present preferred embodiment of the invention but changes and modifications may be made as regards this particular illustration, all within the true intent and scope of the invention as hereinafter defined and claimed.

Fig. 1 in the drawing is a front or face view of the color wheel, with the electric cord broken away at the bottom;

Fig. 2 is a back view of the same, with the handle broken away and in section to show the automatic starting and stopping switch enclosed therein;

Fig. 3 is an edge view of the device;

Fig. 4 is a face view of the segmental color disc;

Fig. 5 is a broken sectional detail of the disc and the color phasing button of the motor shaft exposed at the center of the device.

The device shown consists of a pair of front and back plates 7, 8, spaced apart and having a carrying handle 9 at the bottom.

Affixed to the back plate as by screws 10, is a small synchronous motor 11 having a shaft 12 projecting forwardly through the back plate and carrying a color disc 13 in the space between the plates.

While relatively small and light in weight, this motor is of ample power to turn the disc 13 at synchronous speed.

By reason of the power requirement this motor may be of greater transverse dimensions than the normal pupilary spacing of the eyes.

Accordingly, it is a part of the present invention to use a motor having sufficient transverse dimensions for power requirements, but low overhead, that is above the shaft, and to locate this motor on the back plate mainly below the upper arc of the disc, as generally shown in Figs. 2 and 3, and thus to provide space in the quadrant above the shaft center for pupilary spaced eye openings 14.

This location of the eye openings in the quadrant above the motor center has further advantages in that this makes it necessary to provide double the number of color segments on the disc, and this in turn means that the disc should rotate at half what might be considered normal speed, requiring less power and a lighter motor of smaller size.

Fig. 4 shows the arrangement of color segments on the disc with four green segments 15, four blue segments 16 and four red segments 17, all of equal size and with segments of like color directly opposite and each adjoining pair of like color segments separated by two unlike color segments.

The eye openings 14 are located at a distance above the shaft center to bring them into registry with pairs of like segments traversing the upper arc of rotation, substantially as indicated by the broken lines in Fig. 4.

The wiring 18 for the motor may be extended up through the handle, and this handle further may contain a mercury switch 19 or equivalent in the supply line, which will close the circuit, Fig. 2, when the device is raised to an operative position and will interrupt the circuit to shut off the motor when the device is laid down after use. Consequently, with the supply cord plugged into a circuit outlet the device may be picked up for use at any time and be shut off without bothering to turn a switch on and off. It is furthermore assured that the device will only operate when held in properly usable position.

For color phasing purposes the shaft is shown as carrying at the front end a phasing button 20 exposed through a center opening 21 in the front cover plate 7, which may be reached by a thumb or finger of the hand holding the device, or possibly by a finger on the other hand, to momentarily delay or stop the wheel, to bring the color segments into proper phase with the color signals of the television set. As a further feature, the phasing button may have teeth, lines or other marks 22, of a proper number (ten in the illustration) to act as a stroboscopic indicator when viewed in fluorescent, neon, or similar illumination, to show whether the motor is operating in synchronism with the set.

The location of the motor mainly below the center of rotation and therefore closer to the handle 9, provides a good balance for holding the device in the hand. The motor, only running at half speed, may be of low power and therefore quite light and small. Using little power, it does not heat and therefore does not radiate any objectionable heat to the hand or toward the face of the user. The speed of the motor may be checked for synchronism by observing the stroboscopic button on the front end of the motor shaft, and this same button may be touched at any time to immediately bring the color segments into proper phase with the television signals.

The invention provides a small, inexpensive unit which may be used to see color pictures on any television set equipped to receive color signals and which without the color wheel appear in black and white on the television screen.

In Fig. 5 the color disc is shown as having an angularly adjustable mounting on the motor shaft by being carried by a split collet clutch type of mounting collar 23 having frictional engagement on the shaft.

This construction permits the color disc to be rotatively adjusted on the motor shaft, for instance by holding it at the edge and then turning the motor shaft by means of the phasing button 20 exposed at the outer end of the shaft.

What is claimed is:

1. A color wheel for viewing color pictures appearing in black and white on a television screen, and comprising a small synchronous motor having a shaft, a color disc mounted on said shaft and rotated by said motor, said color disc having twelve equal color segments of three colors arranged in four groups with like color segments diametrically opposite and pairs of like color segments separated by two segments of unlike colors, a cover over said disc having pupilary spaced eye openings above the center of the disc at a point to simultaneously expose each pair of like color segments travelling through the upper arc of rotation and having an opening at the center exposing the end of the motor shaft for gripping engagement by the fingers and a friction clutch adjustably holding said color disc on the shaft and whereby when the shaft is held the color disc may be relatively adjusted thereon for bringing the color segments of the disc into properly phased relation with the motor.

2. A color wheel for viewing color pictures appearing in black and white on a television screen, and comprising a small synchronous motor, a color disc rotated by said motor having twelve equal color segments of three colors arranged in four groups with like color segments diametrically opposite and pairs of like color segments separated by two segments of unlike colors, and a cover over said disc having pupilary spaced eye openings above the center of the disc at a point to simultaneously expose each pair of like color segments travelling through the upper arc of rotation, said cover having an opening at the center of the same below said eye openings and a color phasing button on the end of the shaft exposed at said center opening.

3. A color wheel for viewing color pictures appearing in black and white on a television screen, and comprising a small synchronous motor, a color disc rotated by said motor having twelve equal color segments of three colors arranged in four groups with like color segments diametrically opposite and pairs of like color segments separated by two segments of unlike colors, and a cover over said disc having pupilary spaced eye openings above the center of the disc at a point to simultaneously expose each pair of like color segments travelling through the upper arc of rotation, a stroboscopic indicator at the center of said disc and said cover having an opening exposing said stroboscopic indicator.

4. A color wheel for viewing color pictures appearing in black and white on a television screen, and comprising a small synchronous motor, a color disc rotated by said motor having twelve equal color segments of three colors arranged in four groups with like color segments diametrically opposite and pairs of like color segments separated by two segments of unlike colors, and a cover over said disc having pupilary spaced eye openings above the center of the disc at a point to simultaneously expose each pair of like color segments travelling through the upper arc of rotation, said motor having a shaft and a color phasing button on the end of said shaft and provided with stroboscopic markings, said cover having an opening for exposing said color phasing and stroboscopic button.

5. A color wheel for viewing color pictures appearing in black and white on a television screen, and comprising a small synchronous motor, a color disc rotated by said motor having twelve equal color segments of three colors arranged in four groups with like color segments diametrically opposite and pairs of like color segments separated by two segments of unlike colors, and a cover over said disc having pupilary spaced eye openings above the center of the disc at a point to simultaneously expose each pair of like color segments travelling through the upper arc of rotation, a supporting handle for said device and a laydown switch in said handle for shutting off the motor when the device is laid down and for closing the motor circuit when the device is raised for use and whereby the motor will be automatically shut off any time the device is laid down and can only be operated when the color wheel is raised up into position for actually viewing color pictures.

JOSEPH W. JONES.

References Cited in the file of this patent

UNITED STATES PATENTS

| Number | Name | Date |
|---|---|---|
| 2,384,259 | Quinby | Sept. 4, 1945 |
| 2,384,260 | Goldsmith | Sept. 4, 1945 |